Dec. 26, 1961  D. DEWAR  3,014,763
ELECTRICALLY-OPERATED FLUID-PRESSURE BRAKING SYSTEM
Filed Dec. 3, 1957
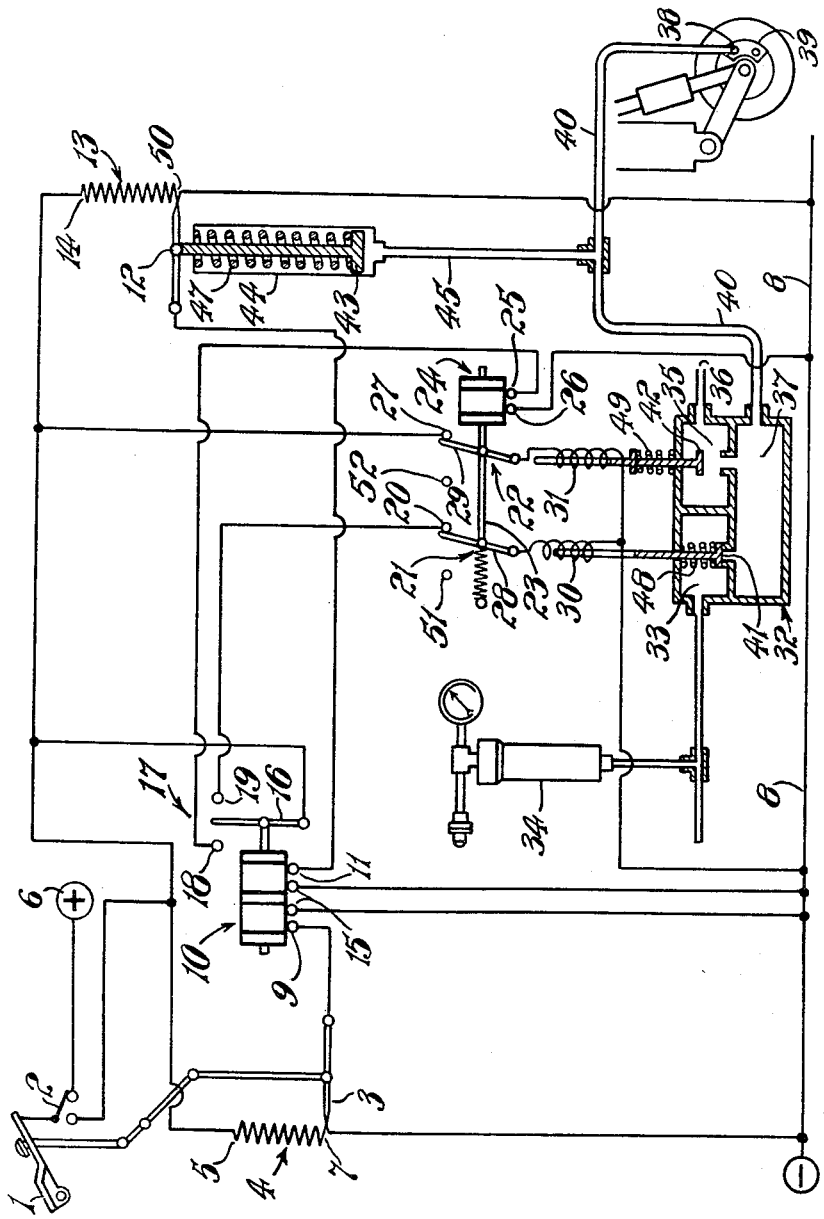
INVENTOR
Douglas Dewar
by Benj. T. Rauber
his attorney

United States Patent Office 3,014,763
Patented Dec. 26, 1961

3,014,763
ELECTRICALLY-OPERATED FLUID-PRESSURE BRAKING SYSTEM
Douglas Dewar, Wolston, near Coventry, England, assignor to Dunlop Rubber Company Limited, London, England, a British company
Filed Dec. 3, 1957, Ser. No. 700,443
5 Claims. (Cl. 303—20)

This invention relates to an electrically-operated fluid-pressure-actuated braking system for vehicles, and more particularly relates to a differential braking system for aircraft.

The object of the invention is to provide a braking system wherein the valve mechanism controlling the supply of pressure-fluid to the brakes is actuated electrically by movement of a foot-pedal or like control means.

According to the invention an electrically-operated fluid-pressure braking system comprises a switch to energize an electric circuit, means selectively to operate a potentiometer in accordance with the degree of braking required, a valve mechanism connected to a source of fluid pressure, to said brakes and to exhaust and comprising electrically-operated means to open a normally spring-closed inlet valve and to close a normally spring-opened exhaust valve, a follow-up potentiometer operated by a fluid-pressure device responsive to the selected braking pressure and means whereby the electrically-operated means for controlling the valves are de-energized when the potentiometers are in balance.

According to the present invention also an electrically-operated fluid-pressure braking system comprises a foot-pedal or like means operable to first close a main switch and energize an electrical circuit and then to operate the sliding contact of an initiating potentiometer according to the degree of braking to be applied, a fluid-pressure operated mechanism adapted to operate the sliding contact of a follow-up potentiometer, a differential relay adapted to be energized through said potentiometers to actuate the contactor arm of a switch and, when a state of unbalance is set up therein, to move it from a central position to one of two terminal positions, a solenoid-operated, spring-returned, inlet valve and a solenoid-operated, spring-opened, exhaust valve mechanism to control the supply of fluid-pressure from a source thereof to a brake mechanism and to said fluid-pressure operated mechanism, and means responsive to the position of said contactor arm to close the inlet valve and open the exhaust valve and allow the flow of fluid-pressure to exhaust when the contactor arm is in said central position, to open the inlet valve and close the exhaust valve and allow the flow of pressure-fluid to the brake mechanism and to said fluid-pressure operated mechanism when the contactor arm is in one terminal position, and to close both the inlet and exhaust valves and hold the required braking pressure in said brake mechanism when the contactor arm is in the other terminal position.

Said means preferably comprises a brake-control relay connected through one terminal of the differential-relay switch to a source of potential. Energization of said relay moves the coupled contactor arms of a pair of switches which are connected to the solenoids of the inlet and exhaust valves respectively.

Preferably, also, the brake-control relay is also operable to actuate its associated switches by an electrical signal transmitted through any one of a number of switches controlled by various detector devices, such as wheel-skid detectors, landing speed and touch-down detectors, each of which may act as an over-ride switch to prevent or remove braking pressure irrespective of the pilot's control.

A differential braking system for an aircraft having port and starboard wheel brakes will now be described with reference to the accompanying diagrammatic drawing which shows the electrical and fluid-pressure system as applied to the port side only, i.e. between the port wheel-brake and the port foot-pedal. It is to be understood that there is an identical system on the starboard side, but that system is omitted from the drawing and description for the sake of clarity therein.

The port braking system comprises a foot-pedal 1, which, on initial movement thereof, operates to close an electrical switch 2 and thereby energize the electrical circuit to be described. The foot-pedal 1 is linked to the sliding contact 3 of a potentiometer 4, hereinafter termed an initiating potentiometer, in such a manner that the effective resistance thereof is at a minimum when the pedal 1 is fully depressed and is at a maximum when there is no pressure thereon. One end 5 of the potentiometer 4 is connected, through said pedal-operated switch 2, with the positive supply 6 of electrical current, whilst the other end 7 of the potentiometer 4 is connected to the negative, or earth, side 8 of the electric circuit.

The sliding contact 3 of the potentiometer 4 is connected to one end terminal 9 of a differential moving-coil relay 10 with a central "off" position, the other end terminal 11 being connected to the slide of a second potentiometer 13, which is also connected at one end 14, through the pedal-switch 2, with the positive supply 6 of electrical current and at the other end to the negative side 8. The intermediate contacts 15 of the relay 10 are connected in parallel to the negative side of the electrical circuit.

The contactor arm 16 of a switch 17 associated with the differential moving-coil relay 10 is connected through the pedal-switch 2, with the positive source of electricity 6. When the potential on the left-hand side of the relay 10 equals that on the right-hand side, the contactor arm 16 is in a central neutral position between two terminals 18, 19. When the potential on the left-hand side of the relay 10 exceeds that on the right-hand side the contactor arm 16 of the switch 17 is moved to contact the terminal 19 which is connected to a terminal 20 of the switch 21 of a pair of switches 21, 22 which are coupled by a linking bar 23 and are associated with a brake-control relay 24. Similarly when the potential on the right-hand side of the differential relay 10 exceeds that on the left-hand side the contactor arm 16 of the switch 17 is moved to contact the terminal 18 which is connected to a terminal 25 on one side of the brake-control relay 24, the other terminal 26 of which is connected to the negative line 8.

The pair of coupled switches 21, 22 is associated with the brake-control relay 24, the terminal 20 of the switch 21 being, as already described, connected to the terminal 19 of the differential-relay switch 17. The similar terminal 27 of the other switch 22 is connected, through the pedal-switch 2, with the positive source of supply 6. The contactor arms 28, 29 of the coupled brake-relay switches 21, 22 are linked together by the bar 23 and each arm 28, 29 is connected, respectively, to the winding of a solenoid 30, 31 and thence to the negative line 8.

A valve mechanism 32 is provided, and comprises an inlet chamber 33 connected to a source of pressure-fluid 34 (which is shown diagrammatically as a pressure-accumulator, but which may be of any suitable known form), an exhaust chamber 35 connected to exhaust or to a liquid reservoir (depending upon whether a gaseous or a liquid fluid is to be used) and a supply chamber 37 connected to the fluid-pressure operated brakes 38 of the port landing wheel 39 by a conduit 40. An inlet valve 41 in the inlet chamber 33 is adapted to control the passage of pressure-fluid from the inlet chamber 33 to the supply chamber 37, and thence to the brakes 38, whilst an exhaust valve 42 in the exhaust chamber 35 is adapted to control the passage of pressure-fluid from the brakes 38 and supply chamber 37 to the exhaust chamber 35, and thence to exhaust 36. Each of the valves 41, 42 is associated with the core of the respective solenoid 30 or 31 hereinabove described.

The follow-up potentiometer 13 has a sliding contact 12 which is electrically connected to the terminal 11 of the differential relay 10 and which is mechanically connected to a plunger 43 slidable in a cylinder 44 which is in communication through a conduit 45 with the fluid-pressure line 40 connecting the brakes 38 with the supply chamber 37. The plunger 43 is biassed by a spring 47 against the force exerted by the fluid-pressure in said line 40.

With the braking system inoperative, that is to say, with the foot-pedal 1 released, the pedal-switch 2 remains open so that the electrical circuit is not energized. The sliding contact 3 of the initiating potentiometer 4 is at the end 7 thereof to provide maximum electrical resistance therethrough, the contactor arm 16 of the differential-coil relay switch 17 is in a central position and springs 48, 49 associated with each of the valves 41, 42 ensure that the inlet valve 41 is closed and the exhaust valve 42 is open. The cylinder 44 is thus also connected to exhaust 36 and the spring-loaded plunger 43 maintains the sliding contact 12 associated therewith at the end 50 of the follow-up potentiometer 13, i.e. in a position corresponding to the sliding contactor of the initiating potentiometer 4.

To apply the port wheel-brakes 38 the corresponding foot-pedal 1 is depressed an amount determined by the pilot. Movement of the pedal 1 closes the pedal-switch 2 to energize the electrical system. The left-hand side of the differential relay 10 is thus energized, moving the arm 16 of the switch 17 associated therewith into engagement with the contact 19 to allow current to flow through the solenoid 30 associated with the inlet valve 41 to open said valve. At the same time, on energizing the system, the solenoid 31 associated with the exhaust valve 42 is also energized, thereby closing the exhaust valve 42 against its spring 49. Pressure-fluid from the source 34 thereupon flows into the supply chamber 37 and thence through the conduit 46 to the brakes 38.

Pressure also builds up behind the spring-loaded plunger 43 and, moving it against its return spring 47, moves the sliding contact 12 associated therewith along the follow-up potentiometer 13 until the potential on the side of the differential relay 10 associated with the follow-up potentiometer 13 equals that on the side associated with the initiating potentiometer 4. With the circuit thus balanced the contactor arm 16 of the switch 17 associated with said differential relay 10 adopts a central position. The solenoid 30 associated with the inlet valve 41 is thus de-energized and the inlet valve 41 closes under the influence of its spring 48, thus preventing the further flow of pressure-fluid into the brakes 38. Both the valves 41 and 42 are now closed and the braking pressure within the supply chamber 37, pressure line 40, brake 38 and cylinder 44 may be held indefinitely, providing the pilot does not allow the foot-pedal 1 to move either up or down.

To increase the braking pressure the pilot forces the foot-pedal 1 further down to reduce the resistance of the initiating potentiometer 4. A state of unbalance is once more set up in the differential relay 10 and this moves the contactor arm 16 of the switch 7 on to the contact 19 to again energize the solenoid 30 associated with the inlet valve 41. This opens the valve 41 to allow further pressure-fluid to flow to the supply chamber 37 and thence to the brake 38. The spring-loaded plunger 43 is also moved further along the cylinder 44 by this increase in fluid-pressure, and this moves the sliding contact 12 associated with the follow-up potentiometer 13 to once again balance the differential relay 10 so that the selected brake pressure is once again held at the brake 38.

To reduce the braking pressure the pilot decreases the force on the foot-pedal 1 to increase the resistance of the initiating potentiometer 4. The unbalance set up in the differential relay 10 moves the contactor arm 16 of the switch 17 from its central position to contact the terminal 18 to energize the brake-control relay 24. Energization of the relay 24 moves the coupled contactor arms 28, 29 of the two switches 21, 22 into contact with contacts 51, 52, which are dead contacts. The solenoids 30, 31 are thus de-energized so that the springs 48, 49 take charge respectively to close the inlet valve 41 and open the exhaust valve 42. Pressure-fluid from the brake 38 thus flows to exhaust 36 until the spring-loaded plunger 43 moves the sliding contact 12 associated with the follow-up potentiometer 13 to a position producing a resistance identical with that produced by the new position of the initiating potentiometer slide 3. With the differential relay 10 again balanced the contactor arm 16 of the switch 17 associated therewith is again centralized. This de-energizes the brake-control relay 24 and the contactor arms 28, 29 of the switches 21, 22 associated therewith are moved onto the contacts 26, 27 to energize the solenoid 31 to close the exhaust valve. The inlet valve 41 remains closed as, the contactor arm 16 being in a central position, the solenoid 30 remains de-energized.

To remove the braking pressure entirely the pilot allows the foot-pedal 1 to move to its inoperative position. This opens the pedal-switch 2 to de-energize the electrical circuit. The exhaust valve 42 is opened by its spring 49 to allow the pressure-fluid in the brake 38 to flow to exhaust 36 and the two potentiometer sliding contacts 3 and 12 are moved, one by the foot-pedal 1 and the other by the spring-loaded plunger 43, to their inoperative positions at the respective ends 7 and 50 thereof.

An identical system operates between the starboard brake pedal and the starboard brake. Thus by applying equal pressure to both pedals, both wheels can be braked equally. By applying unequal pressure to the two pedals a differential braking effect can be obtained.

A separate electrical circuit may be connected through the terminals 25, 26 of the brake-control relay 24 to exercise an over-riding control over the valve mechanism 32. Such a circuit may include a number of "on-off" switches each of which is controlled by a device such as a known type of wheel-skid detector adapted to open the exhaust valve 42 and close the inlet valve 41 to relieve the braking pressure upon sudden deceleration of the wheels as in the development of an incipient skidding or locking condition thereof. Other devices which may also be connected in series in this circuit are a centrifugal switch which will close the circuit to relieve the brakes when the wheels are stationary and a further switch suitably connected into the oleo leg which will open the circuit to apply the brake when the oleo leg is under full load. Such devices are known in the art and, as they form no part of the present invention, require no detailed description.

Having now described my invention, what I claim is:

1. An electrically-operated fluid-pressure braking system comprising a main electric circuit having a main switch to energize said circuit when closed and an initiating potentiometer having a sliding contact to control its output potential, a movable element to close said main switch and to move said sliding contact, a follow-up potentiometer having a fluid actuated sliding contact to control its output potential, a valve mechanism having an inlet valve comprising an electric control element to admit pressure fluid to a braking system and to said fluid actuated sliding contact of said follow-up potentiometer and having an exhaust valve comprising an electric control element to exhaust fluid from said braking system and from said fluid actuated sliding contact, an electric control circuit comprising the electric controls of said valves and comprising a differential relay under opposing potentials of said potentiometers to hold said inlet and exhaust valves closed when said main switch is closed and said potentials are balanced and to open said inlet valve when overbalanced by said initiating potentiometer and to open said exhaust valve when overbalanced by said follow-up potentiometer, said exhaust valve being open and said inlet valve being closed when said circuits are de-energized by the opening of said main switch, the electric control of said exhaust valve having an exhaust control circuit controlled by said main switch and a solenoid operated switch in said exhaust control circuit normally closing said circuit when said main switch is closed and controlled by said differential relay to open said circuit to release said exhaust valve to open position when said relay is overbalanced by said follow-up potentiometer.

2. The braking system of claim 1 in which said inlet valve is spring pressed to closed position and said exhaust valve is spring pressed to open position.

3. An electrically operated fluid-pressure braking system which comprises a valve mechanism having a housing containing an outlet passage, a normally closed inlet valve to said outlet passage and electromagnetic means to open said valve and a normally open exhaust valve from said outlet passage and electromagnetic means to close said exhaust valve, an electric control system having an operator controlled means, a switch actuated by said means to energize said system and said electromagnetic means of said exhaust valve to close said valve, said system comprising a variable initiating potentiometer actuated by said operator controlled means to energize the electromagnetic means of said inlet valve to open said valve and a follow-up variable potentiometer actuated by pressure in said outlet passage to de-energize successively the electromagnetic means of said inlet and exhaust valves successively to close said inlet valve and open said exhaust valve when the potential of said follow-up potentiometer equals and then exceeds the potential of said initiating potentiometer.

4. An electrically-operated fluid-pressure braking system which comprises a valve mechanism having a housing containing an outlet passage, an electromagnetically opened inlet valve to said outlet passage and spring pressed to closed position, and an electromagnetically closed exhaust valve from said outlet passage spring pressed to open position, an electric control system comprising a master switch having operator control means to connect said system to a source of electric energy and to energize the electromagnet of said exhaust valve to close said valve, a variable initiating potentiometer circuit comprising a variable initiating potentiometer controlled by said operator controlled means, a follow-up potentiometer circuit comprising a variable follow-up potentiometer controlled by pressure in said outlet passage, a normally open inlet valve circuit comprising the electromagnet control means of said inlet valve and closed by said initiating potentiometer to open said inlet valve, and an exhaust control circuit controlled by said follow-up potentiometer to open said inlet valve circuit when its potential balances the potential of said initiating potentiometer and to open said exhaust valve when its potential overbalances that of said initiating potentiometer.

5. An electrically-operated fluid-pressure braking system comprising an electric circuit having a pair of terminals and a control switch to close and open said circuit through said terminals, a valve mechanism having a housing containing an outlet passage for the supply of fluid to a brake mechanism, an inlet valve to said passage spring pressed to closed position and an exhaust valve from said passage spring pressed to open position, an exhaust control circuit from one of said terminals of said switch and having in series a circuit breaking switch spring pressed to closed position and an electromagnet to close said exhaust valve, two branched circuits closed by said control switch and in parallel with said exhaust control circuit, the first branch comprising an electromagnet to open said inlet valve and the second branch having an electromagnet to open said circuit breaking switch in said exhaust control circuit, a double throw switch movable from mid position alternatively to close one or the other of said branches, an initiating potentiometer circuit in series with said control switch and having a variable initiating potentiometer actuated upon closing said control switch and an electromagnet to actuate said double throw switch to close said first branch circuit, a follow-up potentiometer circuit comprising a variable follow-up potentiometer and an electromagnet to actuate said double throw switch to close the switch in said exhaust control circuit, and means operated by pressure in said outlet passage to vary said follow-up potentiometer in proportion to the pressure in said outlet passage.

References Cited in the file of this patent
UNITED STATES PATENTS

| | | |
|---|---|---|
| 1,490,145 | Thompson | Apr. 15, 1924 |
| 1,498,504 | Benit | June 17, 1924 |
| 1,763,120 | Aspinwall | June 10, 1930 |
| 2,052,201 | Logan et al. | Aug. 25, 1936 |
| 2,120,207 | Vouch et al. | June 7, 1938 |
| 2,317,383 | Hull | Apr. 27, 1943 |
| 2,413,907 | Brant | Jan. 7, 1947 |
| 2,802,935 | Swander et al. | Aug. 13, 1957 |